March 8, 1960    J. W. BELANGER ET AL    2,927,500
VIEWING DEVICE FOR SELECTING COLOR FILTERS
USED IN PHOTOGRAPHY
Filed Dec. 18, 1956
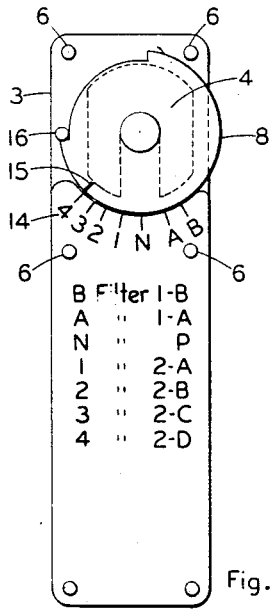
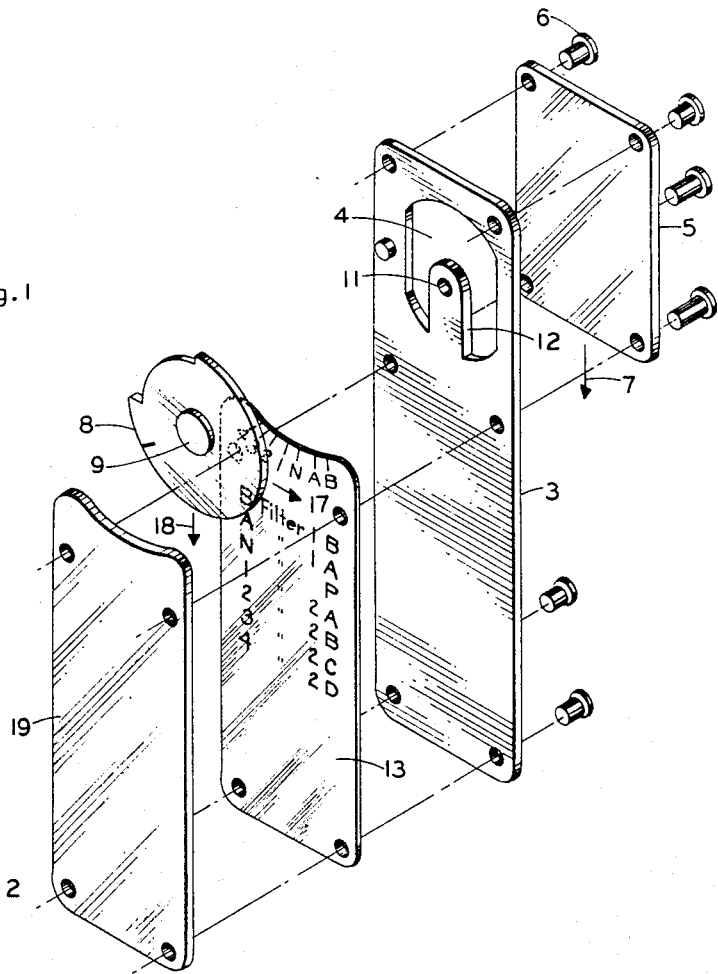
Inventors:
John W. Belanger
Isaac F. Kinnard
by Richard E. Hosley
Their Attorney

United States Patent Office 2,927,500
Patented Mar. 8, 1960

2,927,500

VIEWING DEVICE FOR SELECTING COLOR FILTERS USED IN PHOTOGRAPHY

John W. Belanger, Rexford, N.Y., and Isaac F. Kinnard, Boston, Mass., assignors to General Electric Company, a corporation of New York Application December 18, 1956, Serial No. 629,066

3 Claims. (Cl. 88—1)

This invention relates to a device for visually selecting color correction filters used in color photography and has for its objects the provision of an inexpensive, handy, picket-sized device provided with a viewing aperture through which a scene to be photographed may be readily observed and having a part that is readily and easily adjustable to vary the color of the light transmitted to the observer and constructed so that once the desired color effect is selected, the setting of the adjustable part gives a direct indication of the proper color correction filter to be used.

In the art of color photography, it has long been a practice to use appropriate color correction filters to achieve the degree of warmth or coldness desired in a particular photograph. Many types of such filters are commercially available and in general they comprise various shades of blue which may be used when a cold or bluish effect is to be achieved and many shades of yellow, red, orange, brown or combinations thereof, which may be used to achieve a warm or yellowish effect on the photograph. Neutral-color filters may also be used, which are polarized to achieve some control of reflected light and color saturation.

Recently there has been available to the color photographer a variable color filter which, in a unitary assembly that can be readily mounted on the camera, embodies adjustable filter elements which can be set in different positions to give a wide range of color correction as desired. One such variable color filter, known as the type PA-1, is sold by the assignee to whom the present invention is assigned, and is manufactured in accordance with the teachings of U.S. Patent No. 2,298,059, issued to Edwin H. Land on October 6, 1942. This variable color filter has a rotatably mounted partially-polarized dichroic filter element which cooperates in various positions relative to a fixed, polarized, neutral-color filter element to produce a color correction ranging from warm through neutral to cold. A scale is provided on the variable color filter to permit ready adjustment of the filter corresponding to the color correction desired and normally, the position of the filter is established by use of a so-called "color temperature meter" suitably calibrated to indicate directly the proper setting of the variable color filter.

Although precise, accurate settings may be established by the use of so-called "color temperature meters," it has been found that the variable color filter can be set visually merely by viewing the scene to be photographed through the filter and adjusting it while viewing until the desired color effect as seen by the eye is obtained. When visually selecting the setting of the variable color filter, it has been found necessary to observe the scene to be photographed alternately through the filter and without the filter at about two-second intervals to overcome the accommodation characteristic of the eye. Once the desired appearance has been established through adjustment of the filter setting, it is then necessary to observe the scale setting and then reset the filter to about half the warmth or coldness which appeared visually desirable to obtain the proper setting for the camera since the color densities used in the filter are intended to match most commercial film and do not match the eye. That is, a particular effect found to be visually desirable would not be reproduced on film unless the filter setting were corrected to compensate for the accommodation of the eye.

In the present invention the same principle of filter selection is utilized in that it is done visually, but the color densities of the polarized elements used in the visual selector are adjusted so that when the visually desirable color effect is established by the selector, the scale on the selector will directly indicate the precise correction filter to be used or the precise setting of a variable color filter.

The invention, together with its objects and advantages, will be more readily understood upon reference to the drawing annexed hereto in which:

Figure 1 is a front view in elevation of the selector device, and

Figure 2 is an exploded view of the arrangement shown in Figure 1.

Referring now to the drawings, there is shown an elongated support member 3 which may be formed of any suitable material, such as aluminum or plastic, provided with a viewing aperture 4 through which a scene to be photographed may be observed. Overlying the aperture 4 and to the rear of support element 3 is a neutral colored substantially rectangular polarizing member 5 which polarizes all of the light which passes through the viewing aperture to the eyes of the user. The neutral polarizing member 5 may be suitably affixed to the support member by means of a plurality of rivets 6, one of which passes through each corner of the neutral polarizing member. Member 5 is polarized downwardly along its vertical axis as shown by the arrow 7 and is constructed and arranged so that it is substantially non-selective with respect to spectral transmission.

Overlying the viewing aperture 4 in front of the support member 3 is a partially-polarized dichroic member 8. This dichroic member has a substantially circular shape and is provided with a suitable centrally located aperture through which extends a rivet 9, provided in turn with an enlarged head and an inner shank which passes through an aperture 11 provided in the tongue 12 formed as a part of the support 3. The inner shank of the rivet 9 is staked to the tongue 12 and the parts are dimensioned so that the member 8 can be readily rotated, but the assembly is tight enough to allow the member to retain any position to which it is moved.

Also mounted on the front of support member 3 is a scaleplate 13 which has its upper end cut away to conform to the circular shape of member 8 and has arranged there-along the scale 14. The particular scale shown corresponds to the setting scale of the aforesaid type PA-1 variable color filter and this scale cooperates with an indicating mark 15 suitably applied to the surface of the member 8.

It is to be noted that the member 8 has a portion of its periphery cut away, with the cutaway portion subtending an angle of approximately 90°, the respective edges formed at the ends of the cutaway portion cooperating with a stop pin 16 suitably affixed to support 3 to limit motion of the member 8.

The dichroic member 8 is constructed in accordance with the teachings of U.S. Patent Number 2,298,059 and for purposes of explanation herein comprises a laminated assembly which includes sections that are dyed with appropriately colored dyes, the finished part being partially polarized along two axes at 90° relative to each other and in the direction of the arrows 17, 18 shown in Figure 2. As is clearly described in the aforesaid Land patent, the light transmitted through the member 8 is either bluish or yellowish, depending on the angle to which it is oriented with respect to the polarizing member 5. For example, with the member 8 in its first end position, as shown in Figure 1, which has the yellow axis of polarization 18 parallel with the axis of polarization of member 5, the light transmitted through the member 8 is predominantly yellow in color. This represents one limit in the relative positions of the two members and the number "4" on the scale 14 represents the maximum correction for warmth. As the member 8 is rotated relative to the member 5, the light transmitted by the viewing selector becomes less yellow until the indicating mark 15 lines up with the "N" mark on the scale 14. In this relative position of the members, which is intermediate the end positions, the light transmitted is substantially neutral. As the member 8 rotates beyond the neutral position and out to its second end position corresponding to the "B" mark on scale 14, the light transmitted by the viewer becomes increasingly blue or cold, reaching a maximum when the indicating mark 15 lines up with the mark B.

Thus, it is apparent that one using the selector can view a scene to be photographed through the aperture 4 and then select the desired color balance for the light transmitted through the viewer by adjusting the dichroic member 8 relative to the fixed polarizing member 5. The member 8 is mounted slightly off-center relative to the support 3 so that a portion of its periphery extends beyond the edge of the support member for ready manipulation thereof.

The dyes uesd for the dichroic member 8 are selected to give approximately double the color density that is normally used when the dichroic member is part of a variable color filter assembly intended for direct mounting on a camera, and this doubling in color density matches the color accommodation of the average human eye with the response of most commercially available color film so that whne the dichroic member is used as a part of a filter selector, its position gives a direct indication of the proper filter setting to be used. That is, the light transmitted by the viewing device is substantially double the color density of the light transmitter by any particular color correction filter which corresponds to any particular position of the dichroic member 8.

As a further convenience in using the viewing selector, the indicating scale is reproduced lengthwise along the scale plate 13 associated with the handle portion of the selector, which is the lower portion of support member 3, and the type numbers or model numbers of commercially available isotropic color correction filters supplied by the various filter manufacturers can be matched to the scale to form a correlated data table so that the viewing selector can be used to either indicate the proper position of a variable color filter or indicate a particular filter, whatever the situation may be.

Overlying the scaleplate 13 there may be affixed a suitable protective piece of clear plastic material 19 held in place by suitable rivets or the like. In one form of the device it has been found that an overall length of 4½ inches and an overall width of 1¼ inches will be quite adequate and allow the use of a dichroic member having a diameter of approximately 1¼ inches. The aforesaid dimensions readily indicate the handy, pocket-sized nature of the selector and its simplicity of construction indicates that the assembly can be produced at minimum cost. With the color densities appropriately selected for the dichroic member 8, a direct reading device is obtained and all in all, the selector is a very valuable aid to the amateur photographer when taking color photographs.

An additional advantage is also derived from the viewing device, for not only can it be used to select color correction filters, but it may also be used as an aid in the control of reflected polarized light and in the control of the degree of color saturation of objects which reflect polarized light. Thus, and after the viewing device has been used to select the desired color correction filter, the entire viewing device may be rotated with respect to the object or scene to be photographed until the reflection and color saturation appear to be optimum. Such rotation will orient the "N" marking in a particular position relative to the line of sight, and will establish the proper orientation relative to the camera lens for either a variable color filter or a neutral-color polarizing filter. That is, the polarization axis of any polarized filter used in the camera will be oriented parallel to the longitudinal axis of the viewing device.

Therefore, while a particular embodiment of the subject invention has been shown and described herein, it is in the nature of description rather than limitation, and it will occur to those skilled in the art that various changes, modification, and combinations may be made within the province of the appended claims, and without departing either in spirit or scope from this invention in its broader aspects.

What we claim as new and desire to secure by Letters Patent of the United States is:

1. A viewing device for selecting color filters used in photography comprising, in combination: an elongated support member having a viewing aperture located proximate to one end thereof, the other end of said support member serving as a handle, a neutral color, light polarizing member rigidly mounted on said support having a portion thereof overlying said viewing aperture, a substantially circular dichroic light polarizing member rotatably mounted on said support having a portion thereof overlying said viewing aperture, said dichroic member being mounted contiguous to said neutral-color member whereby light from a scene under observation passes through both of said light polarizing members, said dichroic member being adjustable through an angle of about 90° relative to said neutral-color member to change the color balance of the light transmitted through said viewing aperture, and a scale associated with said dichroic member to indicate its position relative to said neutral-color member, said scale having markings corresponding to a range in color correction filters, said light polarizing members being constructed relative to said scale so that the color of the light transmitted thereby is substantially double the color density of the light transmitted by a color correction filter corresponding to any predetermined relative position of said light polarizing members whereby said scale compensates for the accommodation characteristic of the eye of the viewer and directly indicates the proper color correction filter to use for any selected setting of said viewing device.

2. The combination defined by claim 1 wherein said neutral-color member has its axis of polarization parallel to the longitudinal axis of said viewing device to facilitate use of said viewing device as an aid in the control of reflected polarized light from the scene to be photographed and in the control of the degree of color saturation of objects within said scene which reflect polarized light, said viewing device when used for this purpose being rotated by the user until a desired pictorial effect is achieved whereupon the position of said longitudinal axis relative to the line of sight will directly indicate the proper orientation relative to a camera lens for any light polarizing filters used therewith.

3. A viewing device for selecting color filters used in photography comprising, in combination: an elongated flat support member having a viewing aperture located proximate to one end thereof, the other end of said support member being adapted to serve as a handle, a flat neutral-color, light polarizing member rigidly mounted on said support and overlying said viewing aperture, said neutral-color member having its axis of polarization parallel to the longitudinal axis of said viewing device, a flat substantially circular dichroic light polarizing member rotatably mounted on said support and overlying said viewing aperture, said rotatable member being mounted contiguous to said neutral-color member whereby light from a scene under observation passes through both light polarizing members, said rotatable member being rotatably mounted at a point off center relative to said support member and having a portion of the periphery extending beyond the edge of said support member to facilitate manipulation thereof, said rotatable member having a portion of the periphery cut away and cooperating with a stop pin rigidly secured to said support in order to limit the rotation thereof over a predetermined range relative to said neutral-color member, whereby rotation of said rotatable member relative to said rigidly mounted member changes the color balance of the light transmitted through said viewing aperture, and an indicating mark associated with the periphery of said rotatable member and cooperating with a scale fixedly associated with said support member to indicate the position of said rotatable member relative to said neutral-color member, said scale having markings corresponding to a range in color correction filters, said light polarizing members being constructed relative to said scale so that the color of the light transmitted thereby is substantially double the color density of the light transmitted by a color correction filter corresponding to any predetermined relative position of said light polarizing members whereby said scale compensates for the accommodation characteristic of the eye of the viewer and directly indicates the proper color correction filter to use for any selector setting of said viewing device, and whereby said viewing device may be utilized as an aid in the control of reflected polarized light from the scene to be photographed and in the control of the degree of color saturation of objects within said scene which reflect polarized light, said viewing device when used for this purpose being rotated by the user until a desired pictorial effect is achieved whereupon the position of said longitudinal axis relative to the line of sight will directly indicate the proper orientation relative to a camera lens for any light polarizing filters used therewith.

References Cited in the file of this patent

UNITED STATES PATENTS

| | | |
|---|---|---|
| 1,773,436 | Rayton et al. | Aug. 19, 1930 |
| 2,184,015 | McFarlane | Dec. 19, 1939 |
| 2,291,347 | Ryan | July 28, 1942 |
| 2,298,059 | Land | Oct. 6, 1942 |
| 2,748,649 | Orlando | June 5, 1956 |
| 2,825,271 | McKae | Mar. 4, 1958 |